(12) United States Patent
Moody

(10) Patent No.: US 6,289,800 B1
(45) Date of Patent: Sep. 18, 2001

(54) CITRUS-JUICE EXTRACTOR

(75) Inventor: Jim H. Moody, Immokalee, FL (US)

(73) Assignee: David J. Hall, Clermont, FL (US)

( * ) Notice: Subject to any disclaimer, the term of this patent is extended or adjusted under 35 U.S.C. 154(b) by 0 days.

(21) Appl. No.: 09/722,888

(22) Filed: Nov. 27, 2000

(51) Int. Cl.$^7$ .................................. A23L 1/00; A23N 1/00
(52) U.S. Cl. .................. 100/118; 99/495; 99/504; 100/112; 100/131; 100/152
(58) Field of Search ............... 99/495, 502–509, 99/549, 568, 485, 486; 100/116, 118, 152, 154, 130, 98 R, 108, 112, 120, 117, 215, 102, 131, 177, 173, 218, 238, 95, 97, 208, 353; 134/57 R, 167 R; 210/411, 413, 143; 241/74; 424/715, 769

(56) References Cited

U.S. PATENT DOCUMENTS

| | | |
|---|---|---|
| 63,567 | 4/1867 | Fowler . |
| 639,797 * | 12/1899 | Walters et al. ................. 100/120 X |
| 1,153,103 * | 9/1915 | Neale ............................... 99/502 |
| 1,908,807 | 5/1933 | Ashley . |
| 1,985,323 | 12/1934 | McCall . |
| 2,247,190 | 6/1941 | Edenfield . |
| 2,367,859 * | 1/1945 | Fromm ............................ 99/509 X |
| 2,475,559 * | 7/1949 | Wilson ............................. 99/504 |
| 2,511,374 * | 6/1950 | Rahrer ............................. 100/108 |
| 2,552,171 * | 5/1951 | Hagerty ......................... 100/208 X |
| 2,575,584 | 11/1951 | Cohen . |
| 2,667,118 * | 1/1954 | Nelson ........................... 99/495 X |
| 2,723,618 * | 11/1955 | Matthews ...................... 100/130 X |
| 3,106,152 | 10/1963 | Coffelt . |
| 3,185,072 | 5/1965 | Rickard . |
| 4,705,055 | 11/1987 | Rohm et al. . |

* cited by examiner

Primary Examiner—Timothy F. Simone
(74) Attorney, Agent, or Firm—Edward M. Livingston, Esq.

(57) ABSTRACT

A citrus-juice extractor has two squeeze belts (1, 2) with vertical squeeze surfaces (4) on opposite sides of a progressively narrowed squeeze channel (3). A fruit-half feeder (10) at a wide end of the squeeze channel halves uncut fruit (37) and positions it cut-face-down on a horizontal conveyor (7) intermediate the fruit-half cutter and entrapment positioning between the vertical squeeze surfaces for progressively squeezing conveyance between the vertical squeeze surfaces while the fruit halves are in transit to a narrow exit end (6). Clean-water sprayers (13) and/or other conveyor washers spray-clean the squeeze belts of oil and other contaminants continuously intermediate return belt travel from exit end to the wide end of the squeeze channel. Width of the squeeze channel is pressure-controlled to accommodate widths and consistencies of fruit halves without rupturing the fruit peel.

23 Claims, 3 Drawing Sheets

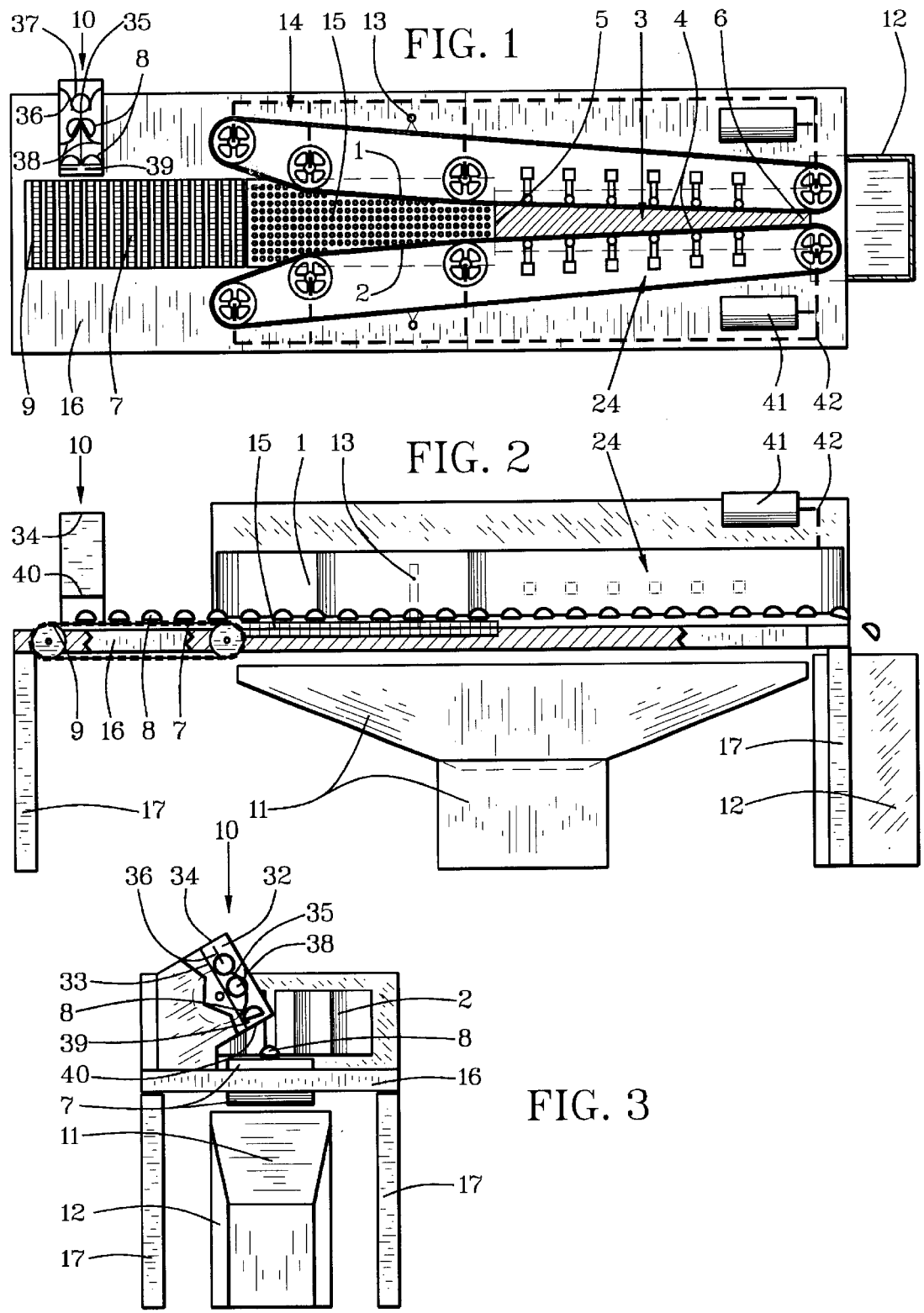

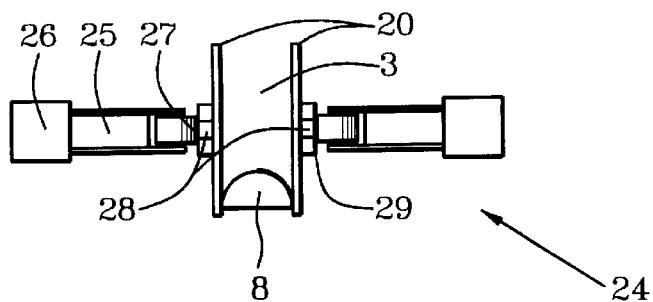
FIG. 8
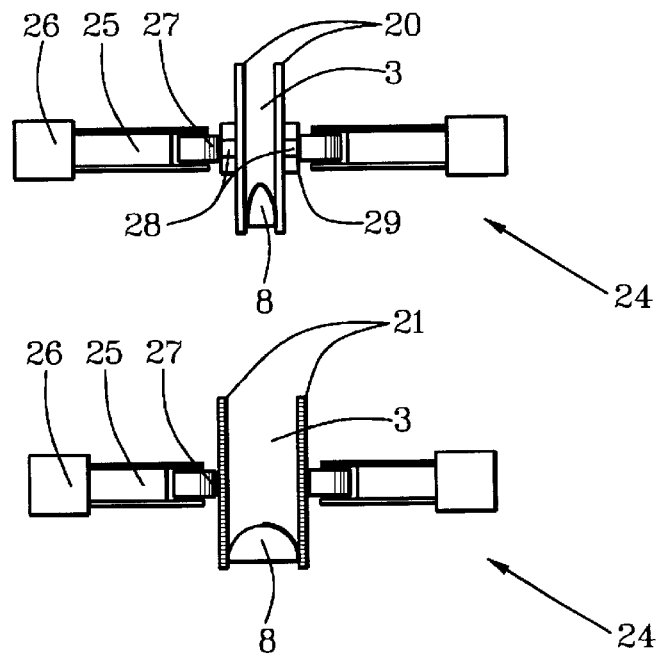
FIG. 9
FIG. 10
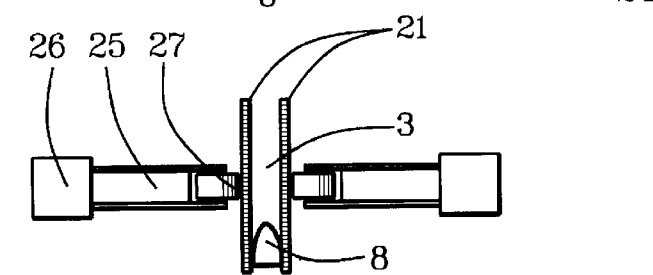
FIG. 11
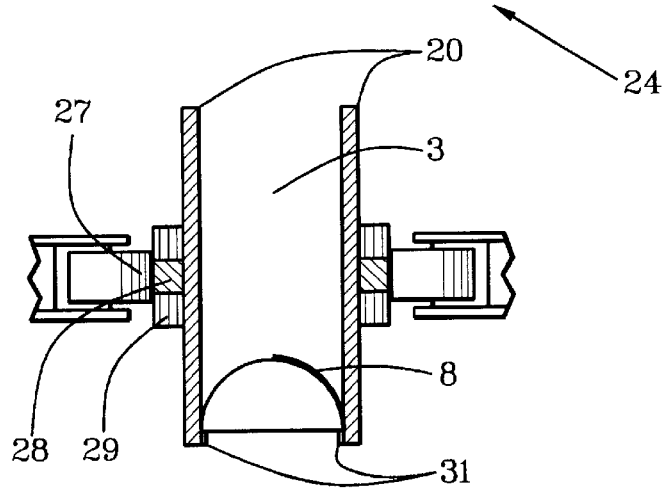
FIG. 12

CITRUS-JUICE EXTRACTOR

BACKGROUND OF THE INVENTION

This invention relates to processing citrus fruit for extraction of juice separately from fruit peel for further processing.

There are known citrus-juice extractors, but none with effective and efficient separation of juice from peel for further separate processing in a manner taught by this invention.

Examples of known related but different juice extractors are described in the following patent documents. U.S. Pat. No. 3,185,072, issued to Rickard on May 25, 1965, described a juice extractor having a perforated platform on which flat faces of halved citrus fruit were placed while domes of the halved citrus were pressed down to squeeze juice of the fruit through apertures of the perforated platform. Although efficient for getting most of the juice, it spread apart and tore the peel. This allowed high-value peel oil to escape and be squeezed into the juice with wasteful contamination. U.S. Pat. No. 3,106,152, issued to Coffelt on Oct. 8, 1963, described a continuous fruit press that was effective for crushing grapes but wasteful and contaminating for juicing citrus fruit. U.S. Pat. No. 2,575,584, issued to Cohen on Nov. 20, 1951, described projecting suction tubes into citrus fruit for sucking it out, but without high effectiveness. U.S. Pat. No. 2,247,190, issued to Edenfield on Jun. 24, 1941, described a fruit juicing machine which halved citrus fruit, placed in cut-face-down on a conveyor belt and then squeezed it from opposite sides by oppositely disposed rollers to cause juice to run vertically down out of the halved fruit. The rollers were referred to as rotatable extracting elements and pressing means. U.S. Pat. No. 1,985,323, issued to McCall on Dec. 25, 1934, described a citrus fruit juice machine having two side-by-side top conveyor belts and two side-by-side bottom conveyor belts converging in a "V" channel for conveying and crushing halved citrus fruit vertically. A vertical slitting knife between the side-by-side top and the side-by-side bottom conveyor belts halved partially squeezed citrus fruit to position fruit halves as cut for being top-to-bottom squeezed for exit of juice laterally from a progressively squeezed cut side.

SUMMARY OF THE INVENTION

Objects of patentable novelty and utility taught by this invention are to provide a citrus-juice extractor which:

does not split or crack peel;

minimize the mixing of peel oil with fruit juice; and extracts juice from citrus fruit thoroughly.

This invention accomplishes these and other objectives with a citrus-juice extractor having two conveyor belts with vertical conveyor walls comprising opposite sides of a progressively narrowed squeeze channel. A fruit slitter at a wide end of the squeeze channel halves the citrus fruit and positions it cut-face-down on a horizontal conveyor intermediate the slitter and entrapment positioning between the vertical conveyor walls for progressively squeezing conveyance between the vertical conveyor walls while the fruit halves are in transit intermediate a terminal end of the horizontal convey and a peel receiver at a narrow terminal.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 1 is a partially cutaway top view;

FIG. 2 is a partially cutaway side view;

FIG. 3 is a partially cutaway front-end view;

FIG. 8 is a partially cutaway front view of oppositely disposed portions of the squeeze belt having rigid plates joined pivotally and retaining a fruit half proximate a wide entry of a squeeze channel having inward-pressure of squeeze adjusters;

FIG. 9 is the FIG. 8 illustration proximate a narrow exit of the squeeze channel;

FIG. 10 is a partially cutaway front view of oppositely disposed portions of the squeeze belt that is flexible horizontally, but not vertically and is retaining a fruit half proximate a wide entry of a squeeze channel having inward-pressure of squeeze adjusters;

FIG. 11 is the FIG. 10 illustration proximate a narrow exit of the squeeze channel; and FIG. 12 is a front view of a squeeze channel with squeeze belts having fruit-retainer ridges.

DESCRIPTION OF PREFERRED EMBODIMENT

Figure 4:
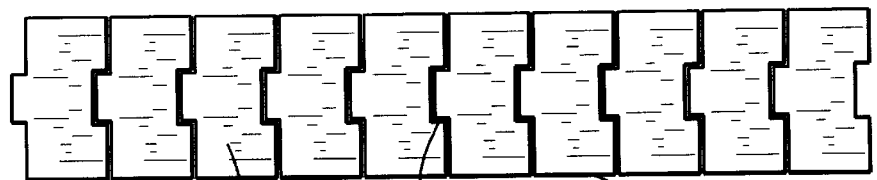
FIG. 4 is a side view of a portion of a squeeze belt having rigid plates joined pivotally.

Listed numerically below with reference to the drawings are terms used to describe features of this invention. These terms and numbers assigned to them designate the same features throughout this description.

1. First squeeze belt
2. Second squeeze belt
3. Squeeze channel
4. Squeeze surfaces
5. Wide entry
6. Narrow exit
7. Conveyor
8. Fruit half
9. Loading end
10. Fruit-half feeder
11. Juice collector
12. Peel collector
13. Clean-water sprayers
14. Return loops
15. Funnel platform
16. Juicer platform
17. Juicer legs
18. Belt-segment plates
19. belt cog wheels
20. Flat squeeze surfaces
21. Endless belt
22. Belt wheel
23. Stiffener rods
24. Squeeze adjusters
25. Adjustment members
26. Adjustment mount
27. Adjustment rollers -continued 28. Back ridges
29. Pivotal joints
30. Cog grooves
31. Fruit-retainer ridges
32. Chute
33. Bottom of chute
34. Fruit entry
35. Slitting blade
36. Center guides
37. Uncut fruit
38. Half separators
39. Tripper bars
40. Chute exit
41. Motors
42. Power conveyances Referring first to FIGS. 1–3, two squeeze belts, which are a first squeeze belt 1 and a second squeeze belt 2, have vertical walls on opposite sides of a squeeze channel 3 intermediate squeeze surfaces 4. The squeeze belts have travel patterns with linear-travel portions that are oppositely disposed to converge for fruit squeezing progressively intermediate a wide entry 5 and a narrow exit 6 of the squeeze channel 3. The travel patterns have return loops oppositely disposed from the squeeze channel 3 with the first squeeze belt 1 traveling in an opposite belt-rotational direction from the second squeeze belt 2 for common-directional travel of the squeeze sections linearly at the squeeze channel 3.

A conveyor 7 has a horizontal platform for conveyance of fruit halves 8 from a loading end 9 of the conveyor 7 to proximate the wide entry 5 for opposite-side grasping of the fruit halves 8 by the squeeze surfaces 4.

A fruit-half feeder 10 is positioned proximate the loading end 9 of the conveyor 7. A juice collector 11 is positioned vertically under the squeeze channel 3. The juice collector 11 could be divided into sections to catch and separate the juice at the beginning of the squeeze cycle and later in the squeeze cycle as the better quality juice would occur during the first part of the squeeze cycle due to less peel oil being extracted. A peel collector 12 is positioned proximate the narrow end of the squeeze channel 3. Belt cleaners, preferably clean-water sprayers 13, are positioned proximate the return loops 14.

The conveyor 7 can be extended to the wide entry 5 or, optionally as shown, can be supplemented by a funnel platform 15 having juice-collection orifices intermediate the conveyor 7 and the wide entry 5 as shown in a fruit-feed funnel. Optionally also, a juicer platform 16 can be positioned on juicer legs 17 for support.

Figure 5:
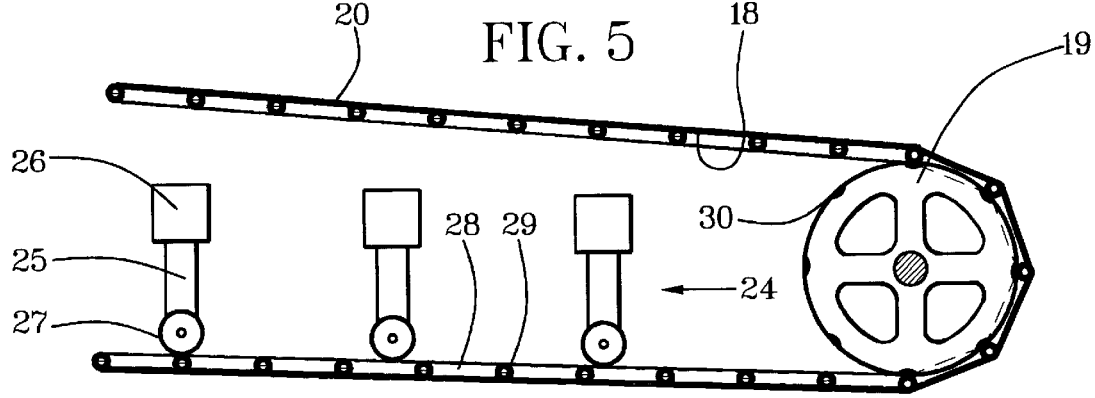
FIG. 5 is a top view of a portion of the squeeze belt having rigid plates joined pivotally.

Referring to FIGS. 1–5, the vertical walls of the squeeze belts 1 and 2 can have belt-segment plates 18 that are joined pivotally at common sides to belt-rotate on belt rollers such as belt cog wheels 19 as depicted in FIGS. 4–5. Flat squeeze surfaces 20 on the belt-segment plates are void of structure that would tend to rupture peel and release peel oil or other peel juice into fruit juice being extracted in the squeeze channel 3. Optionally, the flat squeeze surfaces 20 can have predetermined softness and grasping irregularity to aid in preventing peel rupture in addition to decreasing slipperiness for retaining the fruit halves 8 while being squeezed.

Figure 6:
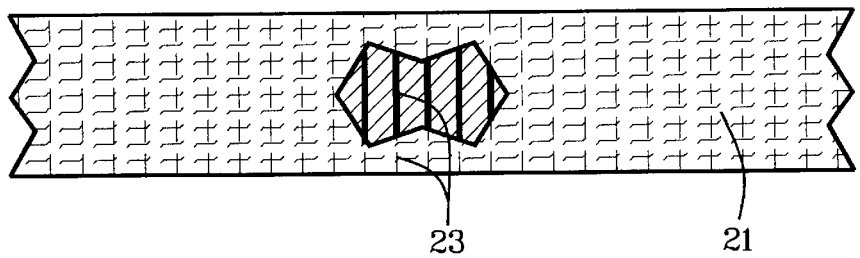
FIG. 6 is a side view of a portion of a squeeze belt that is flexible horizontally and has vertical stiffness.
Figure 7:
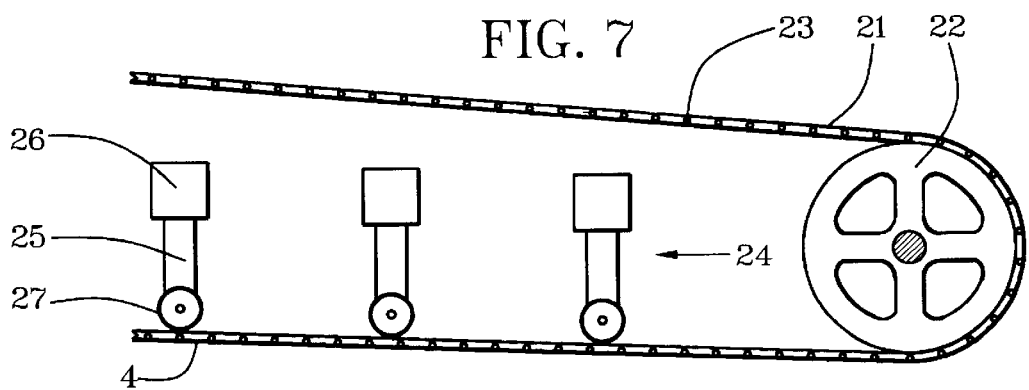
FIG. 7 is a top view of a portion of the squeeze belt that is flexible horizontally and has vertical stiffness.

Referring to FIGS. 1–7, the squeeze belts 1 and 2 described in relation to FIGS. 1–3 can be endless belts 21 that are flexible horizontally, but have vertical stiffness to belt-rotate on belt rollers such as belt wheels 22 as depicted in FIGS. 6–7. Vertical stiffness can be provided by stiffener rods 23 embedded laterally in the endless belt 21 which can be rubberlike to avoid peel rupture and slipperiness. The endless belts 21 have the squeeze surfaces 4.

Referring to FIGS. 1–11, squeeze adjusters 24 proximate opposite sides of the vertical walls of the squeeze belts 1 and 2 can be provided for controlling distances of separation and for controlling squeeze pressure of the squeeze surfaces 4 and the flat squeeze surfaces 20 in the squeeze channel 3. The squeeze adjusters 24 include adjustable members 25 which optionally can be rigidly and/or flexibly adjustable intermediate an adjustment mount 26 and adjustment surfaces at belt backs on at least one side of the squeeze channel 3.

The squeeze adjusters 24 can have moving contacts such as adjustment rollers 27 in direct contact with backs of the endless belts 21 or in contact with back ridges 28 intermediate pivotal joints 29 which also can be cogs for belt segments 18 in communication with cog grooves 30 on belt cog wheels 19 as depicted in FIG. 5.

Referring to FIG. 12, face bottoms of the squeeze belts 1 and 2, whether an endless belt 21 or on a belt-segment plates 18, can have fruit-retainer ridges 31 extended predetermined distances laterally into the squeeze channels 3 to restrain the fruit halves 8 from falling down. The predetermined distances that the fruit-retainer ridges 31 are extended is insufficient to prevent a predetermined tightness of squeezing of the fruit halves 8 between the squeeze belts 1 and 2.

Referring further to FIGS. 1–3, the fruit-half feeder 10 includes a chute 32 having a bottom 33 slanted downwardly from a fruit entry 34 towards the conveyor 7. A slitter such as a slitting blade 35 has a cutting plane positioned centrally intermediate and parallel to sides of the chute 32. The sides of the chute 32 have center guides 36 that are articulated to direct uncut fruit 37 centrally in the chute 32 to the slitting blade 35 for equatorial cutting. Half separators 38 are positioned downwardly from the slitter blade 35 to separate the fruit halves 8 into cut-side perpendicularity to the slitting blade 35. Tripper bars 39 are positioned proximate bottom portions of fruit-half travel downwardly in the chute 32 to trip the fruit halves into falling from a chute exit 40 in a downward slant to cut-side-down on the conveyor 7.

Belt rollers such as the belt cog wheels 19 depicted in FIGS. 4–5 and the belt wheels 22 depicted in FIGS. 6–7, are rotated by motors 41 through power conveyances 42 represented schematically by wide dashed lines.

A new and useful citrus-juice extractor having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A citrus-juice extractor comprising:

two squeeze belts having vertical walls juxtaposed on opposite sides of a squeeze channel intermediate squeeze surfaces of the vertical walls;

the squeeze belts are a first squeeze belt and a second squeeze belt having respective travel patterns with linear-travel portions that are oppositely disposed squeeze sections which converge intermediate a wide entry and a narrow exit of the squeeze channel;

the travel patterns having return loops oppositely disposed from the squeeze channel with the squeeze belts traveling in opposite belt-rotational directions for common directional travel of squeeze sections linearly;

a conveyor having a horizontal platform for conveyance of fruit halves from proximate a loading end of the conveyor to proximate the wide entry for opposite-side grasping of the fruit halves by the squeeze surfaces;

a fruit-half feeder positioned proximate the loading end of the conveyor;

a juice collector vertically under the squeeze channel;

belt cleaners proximate the return loops for cleaning the squeeze belts in return travel intermediate the narrow exit and the wide entry; and a peel collector proximate the narrow end of the squeeze channel.

2. The citrus-juice extractor of claim 1 wherein:

the vertical walls have belt-segment plates with connecting sides that are joined pivotally.

3. The citrus-juice extractor of claim 2 wherein:

the belt-segment plates have predetermined widths between connecting sides to provide predetermined distances of constantly convergent travel between the connecting sides.

4. The citrus-juice extractor of claim 1 wherein:

the squeeze surfaces are flat and smooth to prevent fruit-peel rupture that could release peel oil into juice being squeezed from the fruit halves.

5. The citrus-juice extractor of claim 1 wherein:

the squeeze surfaces have bottom edges with fruit-retainer ridges extended horizontally to prevent the fruit halves from falling down.

6. The citrus-juice extractor of claim 1 wherein:

the squeeze belts are endless belts that are flexible horizontally and have vertical stiffness.

7. The citrus-juice extractor of claim 6 wherein:

the endless flexible belts are rubberlike.

8. The citrus-juice extractor of claim 1 and further comprising:

squeeze adjusters proximate opposite sides of the vertical walls for controlling distances of separation of the squeeze surfaces in the squeeze channel.

9. A citrus-juice extractor comprising:

two squeeze belts having vertical walls juxtaposed on opposite sides of a squeeze channel intermediate squeeze surfaces of the vertical walls;

the squeeze belts are a first squeeze belt and a second squeeze belt having respective travel patterns with linear-travel portions that are oppositely disposed squeeze sections which converge intermediate a wide entry and a narrow exit of the squeeze channel;

the travel patterns having return loops oppositely disposed from the squeeze channel with the squeeze belts traveling in opposite belt-rotational directions for common directional travel of squeeze sections linearly;

belt rollers at predetermined positions along the travel patterns;

rotational power sources in rotation-transmittal communication with predetermined belt rollers for rotating the belt rollers for belt rotation of the squeeze belts;

a conveyor having a horizontal conveyance surface for conveying fruit halves from proximate a loading end of the conveyor to proximate the wide entry for opposite-side grasping of the fruit halves by the squeeze surfaces;

a fruit-half feeder positioned proximate the loading end of the conveyor;

a juice collector vertically under the squeeze channel; and belt cleaners proximate the return loops for cleaning the squeeze belts in return travel intermediate the narrow exit and the wide entry.

10. The citrus-juice extractor of claim 9 wherein:

the squeeze adjusters include rigidly adjustable members having length adjustment intermediate adjustment mounts and the adjustment surfaces on at least one side of the squeeze channel.

11. The citrus-juice extractor of claim 9 wherein:

the squeeze adjusters include flexible-pressure members having flexible pressure intermediate the adjustment mounts and the adjustment surfaces on the at least one side of the squeeze channel.

12. The citrus-juice extractor of claim 9 wherein:

the fruit-half feeder includes a slitter and a positioning guide to slit fruit into fruit halves having cut faces and to position the fruit halves with the cut faces down on the conveyor for side-to-side equatorial squeezing for juice extraction downwardly from the cut faces in the squeeze channel.

13. The citrus-juice extractor of claim 12 wherein:

the fruit-half feeder includes a chute having a bottom slanted about forty-to-eighty degrees downwardly from a fruit entry towards the conveyor;

a slitting blade having a cutting plane positioned centrally intermediate and parallel to sides of the chute;

the sides of the chute have center guides that are articulated to direct uncut fruit centrally in the chute to the slitting blade for equatorial cutting;

half separators are positioned downwardly from the slitter blade to separate in the chute to separate the fruit halves into cut-side perpendicularity to the slitting blade; and tripper bars are positioned proximate bottom portions of fruit-half travel in the chute to trip the fruit halves into falling from a chute exit in a downward slant to cut-side-down on the conveyor.

14. The citrus-juice extractor of claim 9 wherein:

the belt cleaners include liquid sprayers with spray nozzles directed onto the squeeze surface at return-travel positions along the travel patterns intermediate the narrow end and the wide entry to the squeeze channel.

15. The citrus-juice extractor of claim 9 wherein:

the vertical walls have belt-segment plates with connecting sides that are joined pivotally; and the squeeze surfaces are flat and smooth to prevent fruit-peel rupture that could release peel oil into juice being squeezed from the fruit halves.

16. The citrus-juice extractor of claim 9 wherein:

the squeeze belts are endless flexible belts.

17. The citrus-juice extractor of claim 16 wherein:

the endless flexible belts are rubberlike.

18. The citrus-juice extractor of claim 9 and further comprising:

a peel collector proximate the narrow end of the squeeze channel.

19. The citrus-juice extractor of claim 9 and further comprising:

fruit-retainer ridges on face bottoms of the squeeze belts;

the fruit-retainer ridges being extended predetermined distances laterally into the squeeze channels to restrain the fruit halves from falling down; and the predetermined distances that the fruit-retainer ridges are extended is insufficient to prevent a predetermined tightness of squeezing of the fruit halves between the squeeze belts.

20. The citrus-juice extractor of claim 9 wherein:

the squeeze surfaces have predetermined softness and irregularity for nonskid and non-rupture grasping of the fruit halves.

21. The citrus-juice extractor of claim 1 wherein:

the squeeze surfaces have predetermined softness and irregularity for nonskid and non-rupture grasping of the fruit halves.

22. The citrus juice extractor of claim 1 wherein:

the juice collector is divided into at least two sections to separate the juice according to quality, one of the at least two sections to collect the juice during a first portion of the squeeze channel and a second of the at least two sections to collect the juice during a latter portion of the squeeze channel.

23. The citrus juice extractor of claim 9 wherein:

the juice collector is divided into at least two sections to separate the juice according to quality, one of the at least two sections to collect the juice during a first portion of the squeeze channel and a second of the at least two sections to collect the juice during a latter portion of the squeeze channel.

\* \* \* \* \*